United States Patent
Myllymäki

(10) Patent No.: US 10,660,467 B2
(45) Date of Patent: *May 26, 2020

(54) METHOD AND DEVICE FOR MONITORING THE SAFE USE OF A COOKER

(71) Applicant: Innohome Oy, Espoo (FI)

(72) Inventor: Matti Myllymäki, Espoo (FI)

(73) Assignee: INNOHOME OY, Espoo (FI)

( * ) Notice: Subject to any disclaimer, the term of this patent is extended or adjusted under 35 U.S.C. 154(b) by 44 days.

This patent is subject to a terminal disclaimer.

(21) Appl. No.: 16/012,857

(22) Filed: Jun. 20, 2018

(65) Prior Publication Data

US 2018/0296028 A1 Oct. 18, 2018

Related U.S. Application Data

(62) Division of application No. 14/587,058, filed on Dec. 31, 2014, now Pat. No. 10,051,993.

(51) Int. Cl.
*A47J 36/00* (2006.01)
*F24C 3/12* (2006.01)
(Continued)

(52) U.S. Cl.
CPC .............. *A47J 36/00* (2013.01); *A47J 36/321* (2018.08); *F24C 3/12* (2013.01); *F24C 7/08* (2013.01); *G05B 13/0265* (2013.01)

(58) Field of Classification Search
None
See application file for complete search history.

(56) References Cited

U.S. PATENT DOCUMENTS 5,717,188 A    2/1998   Vaillancourt
5,723,846 A    3/1998   Koether et al.
(Continued)

FOREIGN PATENT DOCUMENTS

DE   19629155 A1   1/1998
EP    1485652 A1   12/2004
(Continued)

OTHER PUBLICATIONS

Partial European Search Report dated Jul. 30, 2015 issued in corresponding European patent application No. 14199653.8 (6 pages).
(Continued)

*Primary Examiner* — Mohammad Ali
*Assistant Examiner* — Saad M Kabir
(74) *Attorney, Agent, or Firm* — Faegre Drinker Biddle & Reath LLP

(57) ABSTRACT

A method for monitoring the safe use of a cooker uses a monitoring device in which set values for safety limits based on temperature and humidity or gas content measurements are set for sounding an alarm or cutting off the electricity or gas supply to the cooker. The temperature and humidity and/or gas content are measured above the cooker. The set safety limit values for the temperature and the humidity and/or gas content and/or their rates of change are set and the presence of the user is monitored on the basis of the use of the cooker and/or by a sensor which detects the presence of a person and/or by direct control feedback given by the user. The monitoring device is taught user-specific safety limit values automatically and intuitively on the basis of the use of the cooker, and are automatically changed or adjusted on the basis of the teaching.

20 Claims, 3 Drawing Sheets

Figure 1:
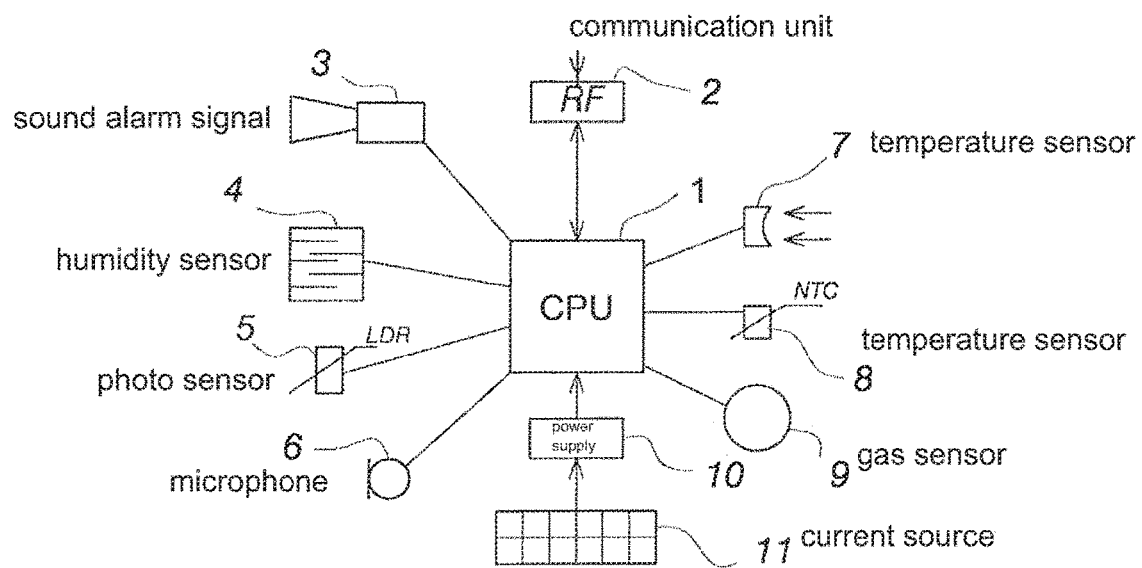

(51) Int. Cl.
 F24C 7/08    (2006.01)
 A47J 36/32   (2006.01)
 G05B 13/02   (2006.01)

(56) References Cited

U.S. PATENT DOCUMENTS

| | | |
|---|---|---|
| 10,051,993 B2 * | 8/2018 | Myllymaki ............. A47J 36/00 |
| 2005/0109333 A1 | 5/2005 | Thomas |
| 2006/0229739 A1 | 10/2006 | Morikawa |
| 2008/0173296 A1 | 7/2008 | Lee et al. |
| 2008/0231468 A1 | 9/2008 | Myllymaki |
| 2009/0085754 A1 | 4/2009 | Myllymaki |
| 2009/0302026 A1 | 12/2009 | Shaw |
| 2012/0097662 A1 | 4/2012 | Ewell, Jr. et al. |

FOREIGN PATENT DOCUMENTS

| | | |
|---|---|---|
| EP | 2533467 A1 | 12/2012 |
| JP | H11-287453 A | 10/1999 |
| KR | 2004-0078775 A | 9/2004 |
| WO | WO-03/074940 A1 | 9/2003 |

OTHER PUBLICATIONS

Extended European Search Report dated Dec. 22, 2015 issued in corresponding European patent application No. 14199653.8 (13 pages).

* cited by examiner

METHOD AND DEVICE FOR MONITORING THE SAFE USE OF A COOKER

RELATED APPLICATION DATA

This application is a divisional application of U.S. patent application Ser. No. 14/587,058, filed Dec. 31, 2014, which claims priority under 35 U.S.C. § 119 and/or § 365 to Finish Patent Application No. 20145016 filed Jan. 10, 2014, the entire contents of each of which is incorporated herein by reference.

The object of the invention is a method for monitoring the safe use of a cooker, in which method is used a monitoring device in which the set values of safety limits based on temperature and humidity and/or gas content measurements are set for sounding an alarm or cutting off the electricity or gas supply to the cooker when the safety limits are exceeded, the temperature is measured in the room, on the surface of the cooker and above it, the humidity and/or gas content above the cooker is measured, the set values of the safety limits for the temperatures measured and the humidity and/or gas content and/or their rates of change or envelope curves are set, and the presence of the user is monitored on the basis of the use of the cooker and/or by means of a sensor which detects the presence of a person and/or by means of direct control feedback given by the user.

A further object of the invention is a device for monitoring the safe use of a cooker, the device including a monitoring device comprising

- a programme-controlled processor with a memory in which the set values of the safety limits for the safe use of the cooker are stored
- a transmitter and/or a signalling device
- two or more of the following sensors:
- a temperature sensor which measures radiation heat
- a temperature sensor which measures convection and/or conduction heat
- a humidity sensor
- a gas sensor
- a light sensor whereupon when the studied measured values of the sensors exceed the set values of the safety limits, the monitoring device transmits a monitoring message and/or sounds an alarm.

Cooker fires are the most common cause of household fires in OECD countries. The number of cooker fires is continuously increasing along with the aging of the population. Already almost 30% of these fires occur to the over 65-year-olds. The most common cause of death (65%) in fires are noxious combustion gases. Injuries are also on the increase.

The greatest problems in using cookers are the various ethnic ways of cooking and forgetting the cooker on. Current cooker safety solutions are based on the cooker's own timers and sensors or on controlling the temperature of the cooker in such a way that the surface temperature of the cooker does not increase above the ignition temperature of cooking oils. The problem with these solutions is insufficient protection in different situations, for example, if old cooking oil is used, which has a lower ignition temperature than new oil, or if a pizza package with a lower ignition temperature than oil or a plastic dish which forms noxious combustion gases is left on the cooker.

Damaged cookware may also cause uncontrolled overheating of the cooker. According to a common erroneous conception, induction cookers are completely safe and involve hardly any risks. According to the latest studies, a dish which has a convex base or is in some way faulty, prevents the correct functioning of the overheating automation of induction cookers and the dish may overheat in an instant. Similarly, small amounts of food in a dish covered with a lid may also heat up quicker than expected.

Widely used separate cooker hoods or wall-mounted infrared sensors limit the use of the technology mainly to electric cookers although, for example in the EU, over 50% of cookers are gas cookers. False alarms by current monitoring devices and delayed reactions are also a problem. Temperature and smoke sensors on ceilings also react too slowly. Smoke detectors are also unsuitable for kitchens because they cause too many false alarms.

One significant problem is the identification of cooking habits and the operating environment so that using the cooker is not limited unnecessarily or that false alarms are not caused, but that the safety solutions still function with sufficient reliability. One of the biggest challenges relating to cookers and their safety devices is, therefore, to be able take into account different cultures and personal habits. Most often, the alarm and safety limits have to be set too high in order to avoid unnecessary restrictions on use or alarms and maintenance calls, in which case the risks increase. The aging of the users and their cognitive capacity also bring additional requirements on the safety devices and user interfaces of cookers.

The aim of the invention is to solve the above-mentioned problems and to provide a method and device by means of which user-specific, that is, individually adapted safe alarm and safety limits can be set automatically without, however, interfering with normal cooking.

This aim is achieved by means of the method disclosed in the accompanying claim 1. The aim is also achieved by means of the device disclosed in the accompanying claim 4 or 5. The dependent claims disclose preferred embodiments of the invention.

By means of the invention is provided an easy-to-use and safe user interface for cookers, or a separately installed and used monitoring device which intuitively learns individual cooking habits by adjusting the alarm values and envelope curves (set values of safety limits) of different sensors and their interrelations in such a way that dangerous situations and misuse are identified at a very early stage without, however, interfering with normal cooking. By means of the invention is further provided an economical and simple solution which is easy to retrofit or to integrate in the control system of the cooker and is adaptable to all electric and gas cookers.

Figure 2:
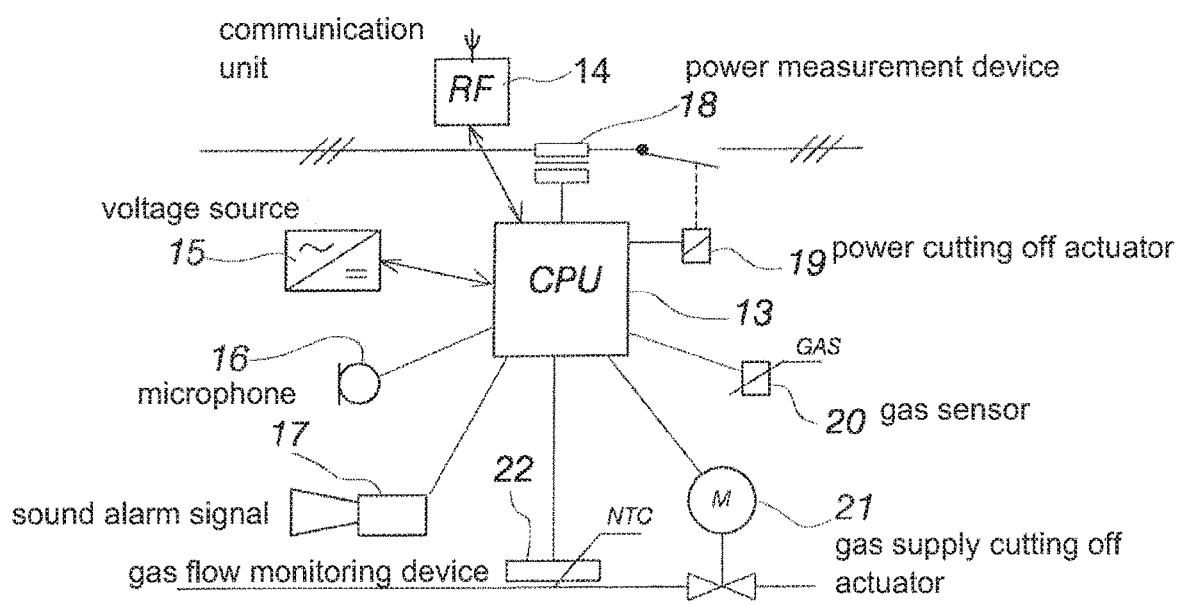
Figure 3:
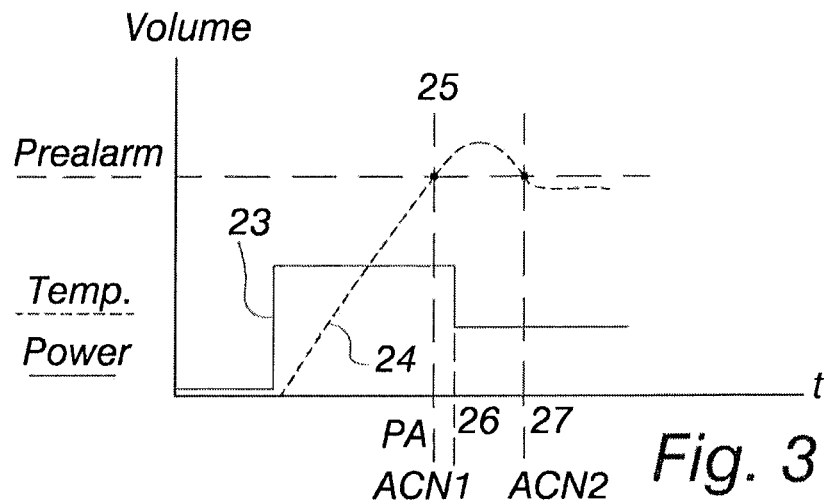
Figure 4:
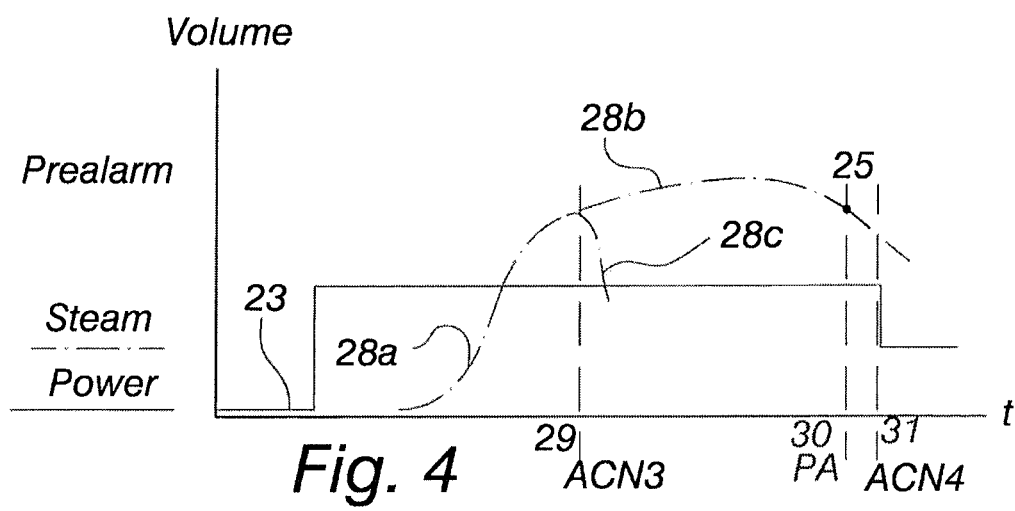
Figure 5:
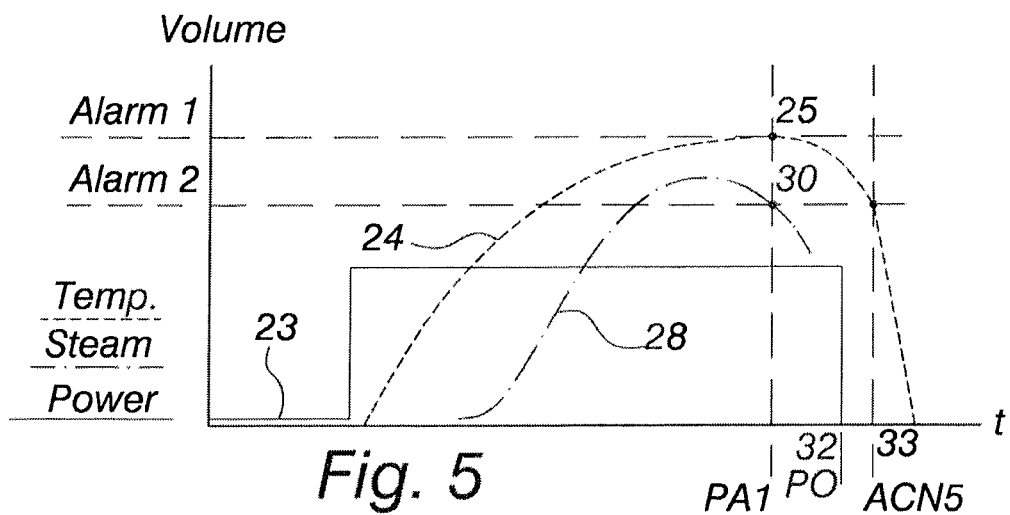
Figure 6:
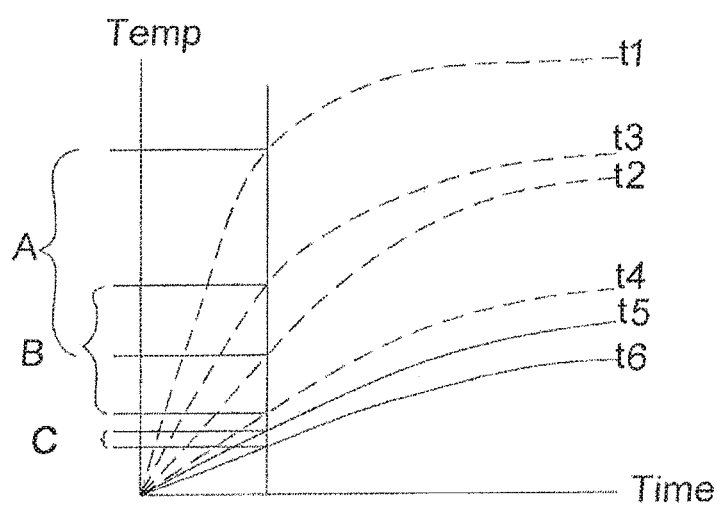

The invention is illustrated in the following by means of an example, with reference to the accompanying drawings, in which FIG. 1 shows an independent intelligent monitoring device which is fitted above a cooker, typically in the cooker hood;

FIG. 2 shows a control unit which is connected to or integrated in the electrical or gas connection of the cooker;

FIG. 3 the graph shows the cooperation of the monitoring device and the control unit and their intuitive user interface learning by means of a simple example;

FIG. 4 the graph shows the cooperation of the monitoring device and the control unit and their intuitive user interface learning by means of a second simple example;

FIG. 5 the graph shows the cooperation of the monitoring device and the control unit and their intuitive user interface learning by means of a third simple example;

FIG. 6 shows the temperature curves, that is, the so-called envelope curves of different cooker types.

The monitoring device above the cooker monitors the conditions above the cooker and the control unit monitors the cooker and its use. Monitoring safe use is based on information provided by both units, for example, on the energy intake of the cooker, operating cycles, lighting, ambient temperature, humidity, noxious gases and the identification of the presence of the user. By means of this measurement data and the control feedback given by the user, the combination constituted by the monitoring device and the control unit is arranged to gradually learn normal and abnormal operating situations. The apparatus thus automatically adjusts the best possible set values for the safety limits user-specifically and no maintenance calls are needed.

The user interface of the monitoring and control device learns automatically and intuitively the user-specific safe safety limit values and envelope curves on the basis of the use of the cooker and the conditions of use allowed by the user. The set values of the safety limits are changed or automatically adjusted on the basis of the learning to values which are determined safe. Due to the learning user interface, the control algorithms are easy to implement and a simple and economical processor solution can be used.

The user interface may also include sounding a preliminary signal which requests the user to confirm or acknowledge whether changing the set value of the safety limits to comply with the existing conditions, or conditions that have recently existed, is accepted.

Identifying the presence of the user is a significant part of the intuitive user interface and control feedback. The user's presence can be identified on the basis of the energy intake of the cooker, when it is used to identify that the user is adjusting the plates of the cooker. The presence can also be identified by the interrelation between the sensor data of the monitoring device connected to the cooker hood and the energy intake of the cooker. For example, if the plates are not adjusted, but the user takes the lid off the pot and stirs the food, this is identified by the rapid change in humidity and temperature above the cooker. The presence of the user can further be identified by a change in the lighting conditions of the cooker.

The user interface may also include sounding a signal as a preliminary alarm before the power supply or gas supply to the cooker is cut off. If the user acknowledges the preliminary alarm either by adjusting the power of the plates to a lower level or by pressing an acknowledgement button, the set values are changed to less sensitive ones. Another significant factor is the point at which the user acknowledges the actual alarm or carries out the corrective action. If the user acknowledges the actual alarm after the electricity has already been cut off from the cooker, either by adjusting the power of the plates to a lower level or by pressing the acknowledgement button, the set values are not changed.

At simplest, the user gives the control feedback by merely adjusting the plates of the cooker, in which case the normal use of the cooker controls the learning of the monitoring and control device. The acknowledgement of a preliminary alarm or alarm with a button always in the same manner in all situations also makes using the apparatus easy. Also the reactions of the user in different situations reveals their cognitive capacity which can be taken into account in the learning of the user interface. For example, if the user reacts slowly, the set values can be changed less than with rapid reactions or the set values can even be changed in a safer direction. Also, repeated situations where the user reacts rapidly can be interpreted as being normal and permissible, which means that the set values are not changed or they are changed so as to be more permissive.

The user interface according to the invention can be implemented by means of the monitoring device according to FIG. 1, attached above the cooker or to the cooker hood, which device may be in wireless data transfer communication with the control unit of FIG. 2 which is connected to the electricity and/or gas supply of the cooker.

The monitoring device attached to the cooker hood typically comprises a microprocessor 1, communication means 2 and a voltage source 10, 11, as well as two or more of the following sensors: a temperature sensor 7 which measures radiation heat, a temperature sensor 8 which measures convection and/or conduction heat, a humidity sensor 4, a gas sensor 9 and light sensors 5, 11. As a light sensor may be a photoresistor 5 or also a solar panel 11, which also acts as a part of the device's power supply 10. As temperature sensors may be, for example, an infrared sensor 7 and/or an NTC sensor 8, in which case they will measure different types of phenomena on the surface of the cooker and above it.

The control unit of FIG. 2 may typically comprise a microprocessor 13, a communication unit 14 and a voltage source 15, as well as a cooker power measurement device 18. The same device may also comprise a gas flow monitoring device 22 and the actuators 19 and 21 required for cutting off the power and gas supplies. In this case, the same control unit can be used in conjunction with both electric cookers and gas cookers. As a monitoring device for detecting the presence of a user can also be used a microphone 16. The control unit monitors with its sensors 18, 16, 22 the surroundings and the gas or electric energy intake of the cooker connected to the control unit and the changes in them.

The analysis of a deviating state is carried out either locally by means of a monitoring device connected to the cooker hood and/or by means of a control unit connected to the cooker. The analysed data from the monitoring device connected to the cooker hood can be transmitted by means of known data transfer technology to the control unit of the cooker and in addition to one or more receivers by means of which the required information can be transferred further or a cooker hood or a roof exhaust fan can be controlled.

In the following is described the cooperation of the monitoring device and the control unit and the learning of their intuitive user interface with reference to the examples shown in FIGS. 3-5.

In FIG. 3, curve 23 represents the electric or gas energy intake of the cooker measured by the sensors 18 or 22 of the control unit. Curve 24 represents the temperature measured by the monitoring sensors 7, 8. When a cooker plate is switched on, its power intake (curve 23) and the user being present are indicated. At the same time, the temperature (curve 24) above the cooker is measured with the cooker monitoring device. When the temperature exceeds the factory-set preliminary alarm limit 25, a repeated short signal by the monitoring device is set off (signal horn 3), which warns the user that the monitoring device has detected a risk situation. When the user adjusts the power intake (curve 23) of the cooker to a lower level, it is detected that the user is still present and the power of the cooker has been adjusted. It is furthermore detected that the temperature (curve 24) above the cooker begins to fall and the risk situation has passed. At the same time, the processors of the monitoring device and control unit verify that the situation was riskless and switch the preliminary alarm off and raise the set values of the preliminary alarm to a higher level. Thus, in the next corresponding situation, no alarm will be sounded yet at this stage. In other words, the user's normal use of the cooker plates controlled the learning event of the user interface and the set values were automatically changed to less sensitive ones.

The graph in FIG. 4 shows the cooperation of the monitoring device and the control unit and the learning of the intuitive user interface which they together form. If the user cooks without a lid on the pot, the user's presence is identified on the basis of the power intake (curve 23) of the cooker and humidity (curve 28a, b, c). The graph in FIG. 4 shows how the user's presence is identified by indicating the humidity, when a rapid change in humidity is detected as the user closes the lid (curve 28c), in which case additional time is given. Alternatively, the fact that the user is not present (curve 28b) is identified, in which case the humidity gradually begins to lessen when the food dries and this is identified at point 30. In this case, a preliminary alarm 25 is sounded and the electricity is cut off from the cooker at point of time 31. In this case, the set values of the safety limits based on sensor measurements are not changed.

In the example of FIG. 5, the conditions at the cooker are described by means of temperature (curve 24), power (curve 23) and humidity (curve 28) measurement curves. The graph shows how two different learned measurements, namely temperature (curve 24) and humidity (curve 28) reach the alarm limits at points 25 and 30 and the electricity is cut off at point 32. The alarm is acknowledged automatically when the electricity is cut off from the cooker and the temperature starts to fall.

The graph of FIG. 6 gives an example indicative of how different cooker types can be identified and better parameters for learning can be obtained. The curves in FIG. 6 show how the temperature curves of different cookers differ when the temperature is measured from the cooker hood and on the surface of the cooker when the cooker plate is switched on when there is, for example, a pot with water on it.

Identifying the cooker type as such is not a primary objective, but rather identifying the thermal behaviour of the cooker.

The graph shows three typical cookers and their temperature curves.

The first is a gas cooker (A, t1,t2), the second is a cast-iron cooker (B, t3,t4) and the third is an induction cooker (C, t5,t6).

The curves in the graph show the change (t2,t4,t6) in temperature on the surface of the cooker hood and the changes (t1,t3,t5) in temperature on the surface of the cooker as a function of time when a pot with 1 litre of water is placed on the cooker plate and the cooker plate is at the highest power setting.

The graph shows how the different cooker types differ from one another, whereupon their thermal behaviour is easy to identify and learn on the basis of the temperature difference between the cooker and the cooker hood. To put it briefly, the graph shows that the gas cooker releases most heat into the surroundings and the surface of the gas ring heats up most, whereas at the other extreme in connection with the induction cooker, the least heat escapes into the surroundings and the cooker plate heats up the least. The cast-iron cooker falls between these two.

Identifying a gas cooker is particularly important because in connection with a gas cooker, objective information on the temperatures of the cooker cannot be obtained only by means of an IR-sensor, but measurement on the surface of the cooker hood, for example by means of a PTC-sensor, is also required.

The invention claimed is:

1. A method for monitoring safe use of a cooker, comprising:
    identifying a thermal behaviour of a cooker based on a temperature differences between the cooker and a monitoring device, wherein the thermal behaviour is represented by a temperature curve with respect to time;
    measuring a temperature above the cooker;
    measuring at least one of i) a moisture content above the cooker and ii) gas content above the cooker;
    monitoring a presence of a user by at least one of i) use of the cooker, ii) a sensor, and iii) a direct control feedback of the user;
    determining if safety limits have exceeded a normal operation of the cooker by using the monitoring device, in which the safety limits are set values based on a combination of a) the measured temperature above the cooker with b) the measured at least one of i) the moisture content above the cooker and ii) the gas content above the cooker, wherein the monitoring device is taught user-specific safe safety limit values automatically and intuitively based on i) use of the cooker based on the measured temperature, ii) the measured moisture content or the measured gas content, and iii) the monitored presence of the user, and wherein the set values of the safety limits are automatically changed or adjusted to set values determined to be safe based on the taught user-specific safe safety limit values; and
    sounding an alarm, cutting off a power to the cooker, or cutting off a gas supply to the cooker, when the set values of the safety limits are exceeded.

2. The method as claimed in claim 1, wherein a control unit is used to cut off the power to the cooker or the gas supply to the cooker, when the set values of the safety limits are exceeded, and
    wherein the measured temperature above the cooker and the measured at least one of i) the moisture content above the cooker and ii) the gas content above the cooker are transmitted from the monitoring device to the control unit and the direct control feedback of the user is analysed automatically and intuitively together with the measured temperature above the cooker and the measured at least one of i) the moisture content above the cooker and ii) the gas content above the cooker.

3. The method as claimed in claim 1, wherein the measured temperature and a rate of change of the measured temperature are measured separately, both based on a combination of radiation heat with at least one of a convection heat or a conduction heat, and
    wherein the measured temperature and the measured rate of change of the measured temperature are used as reference values in determining the set values of user-specific safety limits.

4. The method as claimed in claim 2, wherein the measured temperature and a rate of change of the measured temperature are measured separately, both based on a combination of radiation heat with at least one of a convection heat or a conduction heat, and
    wherein the measured temperature and the measured rate of change of the measured temperature are used as reference values in determining the set values of user-specific safety limits.

5. A device for monitoring safe use of a cooker by identifying a thermal behaviour of the cooker, the device including a monitoring device which comprises:

a programme-controlled processor with a memory in which set values of safety limits for safe use of a cooker are stored, the set values of safety limits representing a normal operation of the cooker;
a transmitter, a signalling device, or both the transmitter and the signalling device;
a radiation temperature sensor which measures radiation heat of the cooker; and
convection temperature sensor or a conduction temperature sensor which measures at least one of a convection heat of the cooker or a conduction heat of the cooker,
wherein the monitoring device is configured to transmit a message, sound an alarm, or both transmit the message and sound the alarm when values measured by i) the radiation temperature sensor and ii) the convection temperature sensor or the conduction temperature sensor exceed the set values of the safety limits,
wherein the monitoring device comprises, or the monitoring device is connected to, a user interface which is arranged to identify a presence of a user near the cooker based on i) use of the cooker, ii) a presence sensor, or iii) directly by a control feedback of the user,
wherein the monitoring device is arranged to automatically learn and adjust the set values of the safety limits by the user interface individually based on a) the use of the cooker or b) the measurement results of i) the radiation temperature sensor and ii) the convection temperature sensor or the conduction temperature sensor when the presence of the user near the cooker has been identified or a combination thereof,
wherein the monitoring device is configured to identify and learn a thermal behaviour of the cooker based on a temperature difference between the cooker and the monitoring device, and
wherein the thermal behaviour is represented by a temperature curve with respect to time.

6. The device as claimed in claim 5, wherein the programme-controlled processor comprises a control algorithm allowing the programme-controlled processor to be arranged to learn intuitively and automatically safe safety limit set values based on the control feedback of the user, the control feedback including values allowed by the user when the presence of the user is detected.

7. The device as claimed in claim 5, further comprising: at least one of a humidity sensor or a gas sensor.

8. The device as claimed in claim 6, further comprising: at least one of a humidity sensor or a gas sensor.

9. The device as claimed in claim 5, further comprising: a light sensor.

10. The device as claimed in claim 6, further comprising: a light sensor.

11. The device as claimed in claim 7, further comprising: a light sensor.

12. The device as claimed in claim 8, further comprising: a light sensor.

13. The device as claimed in claim 5, further comprising:
a measurement device that measures at least one of a power of the cooker and a gas flow of the cooker; and
an actuator that cuts off the at least one of the power of the cooker and the gas flow of the cooker, when values measured by i) the radiation temperature sensor and ii) the convection temperature sensor or the conduction sensor exceed the set values of safety limits.

14. The device as claimed in claim 6, further comprising:
a measurement device that measures at least one of a power of the cooker and a gas flow of the cooker; and
an actuator that cuts off the at least one of the power of the cooker and the gas flow of the cooker, when values measured by i) the radiation temperature sensor and ii) the convection temperature sensor or the conduction sensor exceed the set values of safety limits.

15. The device as claimed in claim 7, further comprising:
a measurement device that measures at least one of a power of the cooker and a gas flow of the cooker; and
an actuator that cuts off the at least one of the power of the cooker and the gas flow of the cooker, when values measured by i) the radiation temperature sensor and ii) the convection temperature sensor or the conduction sensor exceed the set values of safety limits.

16. The device as claimed in claim 8, further comprising:
a measurement device that measures at least one of a power of the cooker and a gas flow of the cooker; and
an actuator that cuts off the at least one of the power of the cooker and the gas flow of the cooker, when values measured by i) the radiation temperature sensor and ii) the convection temperature sensor or the conduction sensor exceed the set values of safety limits.

17. The device as claimed in claim 9, further comprising:
a measurement device that measures at least one of a power of the cooker and a gas flow of the cooker; and
an actuator that cuts off the at least one of the power of the cooker and the gas flow of the cooker, when values measured by i) the radiation temperature sensor and ii) the convection temperature sensor or the conduction sensor exceed the set values of safety limits.

18. The device as claimed in claim 10, further comprising:
a measurement device that measures at least one of a power of the cooker and a gas flow of the cooker; and
an actuator that cuts off the at least one of the power of the cooker and the gas flow of the cooker, when values measured by i) the radiation temperature sensor and ii) the convection temperature sensor or the conduction sensor exceed the set values of safety limits.

19. The device as claimed in claim 11, further comprising:
a measurement device that measures at least one of a power of the cooker and a gas flow of the cooker; and
an actuator that cuts off the at least one of the power of the cooker and the gas flow of the cooker, when values measured by i) the radiation temperature sensor and ii) the convection temperature sensor or the conduction sensor exceed the set values of safety limits.

20. The device as claimed in claim 12, further comprising:
a measurement device that measures at least one of a power of the cooker and a gas flow of the cooker; and
an actuator that cuts off the at least one of the power of the cooker and the gas flow of the cooker, when values measured by i) the radiation temperature sensor and ii) the convection temperature sensor or the conduction sensor exceed the set values of safety limits.

* * * * *